US005712328A

United States Patent [19]

Inoue et al.

[11] Patent Number: 5,712,328

[45] Date of Patent: Jan. 27, 1998

[54] AQUEOUS BALL POINT INK COMPOSITION

[75] Inventors: Shigeyasu Inoue, Kashiwara; Toshimitsu Kawasumi, Toyonaka, both of Japan

[73] Assignee: Sakura Color Products Corporation, Osaka, Japan

[21] Appl. No.: 747,744

[22] Filed: Nov. 12, 1996

Related U.S. Application Data

[63] Continuation of Ser. No. 445,944, May 22, 1995, abandoned.

[30] Foreign Application Priority Data

May 30, 1994 [JP] Japan .................................... 6-116898

[51] Int. Cl.$^{6}$ .................................................... C09D 11/18

[52] U.S. Cl. .............................. 523/161; 524/55; 524/56; 524/878; 260/DIG. 38; 401/210

[58] Field of Search .............................. 523/161; 524/55, 524/56, 878; 260/DIG. 38; 106/20 R, 22 R, 31.13, 31.27; 401/210

[56] References Cited

U.S. PATENT DOCUMENTS

| | | | |
|---|---|---|---|
| 4,545,818 | 10/1985 | Inoue et al. | 106/22 |
| 4,786,198 | 11/1988 | Zgambo | 401/142 |
| 4,940,628 | 7/1990 | Lin et al. | 428/207 |

*Primary Examiner*—Vasu Jagannathan
*Assistant Examiner*—John J. Guarriello
*Attorney, Agent, or Firm*—Larson & Taylor

[57] ABSTRACT

An aqueous ball point ink composition comprising a key aqueous ball point ink composition comprising coloring materials consisting of (pigment and pigment dispersant) and/or precolored emulsion resin, water-soluble organic solvent, pseudoplastic imparting agent and water and cross-linked polyacrylate salt in a proportion of about 0.05–0.5% by weight based on the amount of said key aqueous ball point ink composition.

6 Claims, 1 Drawing Sheet

AQUEOUS BALL POINT INK COMPOSITION

This application is a continuation of application Ser. No. 08/445,944 filed May 22, 1995 now abandoned.

FIELD OF THE INVENTION

The present invention relates to an aqueous ball point ink composition, specifically an aqueous ball point ink composition which is excellent in storage stability under elevated temperature and free of clogging at a point of tip when stored at room temperature for a long period of time.

BACKGROUND OF THE INVENTION

An aqueous ball point ink composition is usually prepared by adding polyhydric alcohol, derivatives thereof and like water-soluble organic solvents to an aqueous solution containing water-soluble dyes, pigments, precolored emulsion resins and like coloring materials.

In particular, an ink containing pigments or precolored emulsion resins as coloring materials is inferior in aging resistance. Long-term storage of the ink will cause separation and sedimentation of coloring materials. To overcome the problems, blending alkaline salts of styrene-acrylic acid copolymer, polyvinyl-alcohol, polyvinyl-pyrrolidone and like water-soluble polymers as dispersant with a conventional ink is tried.

However, the dispersant-containing ink inferior in stability at elevated temperature causes a clogging problem at a point of tip due to sedimentaion of coloring materials, when a ball point pen is stored, for example, under elevated temperature in summer.

It is a primary object of the invention to provide an aqueous ball point ink composition maintaining stable dispersing properties of coloring materials when stored at room temperature as well as elevated temperature for a long period of time resulting in overcoming above-mentioned drawbacks of aqueous ball point ink.

DISCLOSURE OF THE INVENTION

Figure 1:
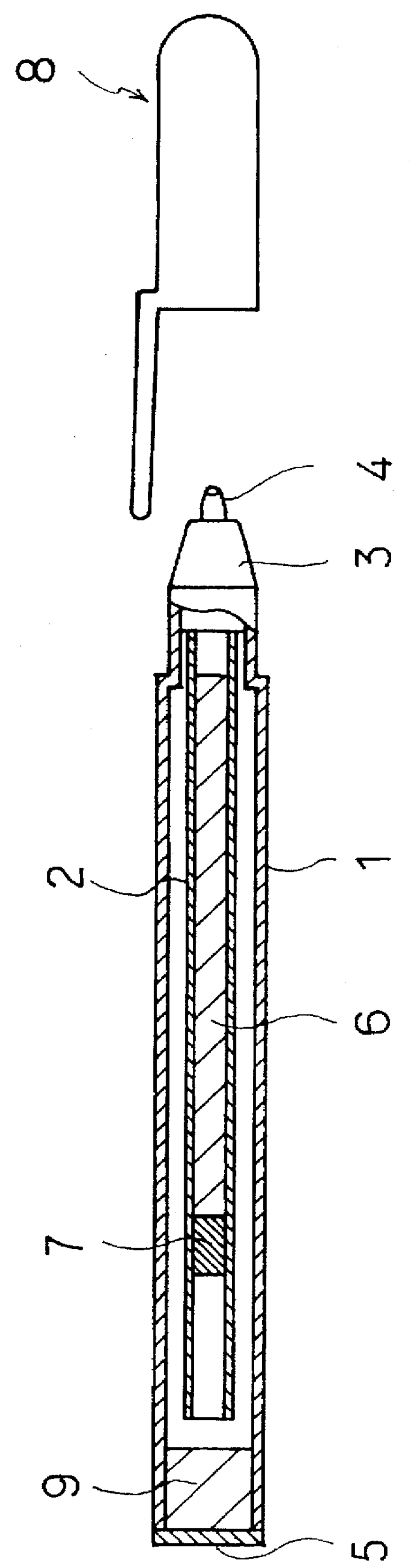
FIG. 1 is a partial sectional view showing an outline of an example of a ball point pen using the aqueous ink composition of the invention.

The inventors conducted extensive research to solve the problems of a conventional aqueous ball point ink and found that said problems are almost solved or greatly reduced by synergistic effects derived from pseudoplastic imparting agent and cross-linked polyacrylate salts, when at least one cross-linked polyacrylate salt is blended with a key aqueous ball point ink composition comprising coloring material consisting of (pigment and pigment dispersant) and/or precolored emulsion resin, water-soluble organic solvent, pseudoplastic imparting agent and water in a proportion of about 0.05–0.5% by weight based on the amount of a key aqueous ball point ink composition.

Thus, the invention provides an aqueous ball point ink composition shown below;

Item 1. An aqueous ball point ink composition comprising a key aqueous ball point ink composition comprising coloring material consisting of (pigment and pigment dispersant) and/or precolored emulsion resin, water-soluble organic solvent, pseudoplastic imparting agent and water; and cross-linked polyacrylate salt in a proportion of about 0.05–0.5% by weight based on the amount of said key aqueous ball point ink composition.

Item 2. The aqueous ball point ink composition according to item 1 wherein said composition has a viscosity of about 2,000 to 8,000 cps.

Item 3. The aqueous ball point ink composition according to item 1 wherein molecular weight of said cross-linked polyacrylate as a free acid ranges about 2,000,000 to 6,000,000.

Item 4. The aqueous ball point ink composition according to item 1 wherein said pseudoplastic imparting agent is Welan gum and/or Xanthan gum.

Item 5. The aqueous ball point ink composition according to item 1 wherein said aqueous ball point ink composition further comprises antiseptic.

Item 6. The aqueous ball point ink composition according to item 5 wherein said antiseptic is 1,2-benzisothiazoline-3-on.

Item 7. A ball point pen comprises an ink storage vessel filled with the aqueous ball point ink composition according to item 1.

The invention will be described below in detail.

The cross-linked polyacrylate is a polymer having a net structure formed by crosslinking branched polyacrylates with each other at moieties other than carboxylate groups. The polymer itself is easily dispersed, but not dissolved, in water. When carboxyl groups in the polymer are not ionized, electric double layer on the surface of pigments and/or precolored emulsion resins as coloring materials is not formed leading to failure of formation of protective colloid. Salts of the polymer prepared by previously adding acid value equivalent of monovalent alkali metal (eg. Na, K) hydroxide, alkali metal carbonate, alkali metal bicarbonate, amine, alkanol amine and the like to the cross-linked polyacrylic acid are adsorbed on the surface of pigments and/or precolored emulsion resins as coloring materials leading to formation of protective colloid by the action of ionized carboxyl groups of the polymer.

The salts of cross-linked polyacrylate are employed in an aqueous solution. The aqueous solution may be prepared by dissolving solid of cross-linked polyacrylic acid isolated, or by adding said alkaline compound to a dispersant of the polymer.

The salts of cross-linked polyacrylate are conventionally available on the market, for example, as trade mark, such as "RHEOGIC 250H" (NIHON JUNYAKU CO., LTD), "JUNLON PW111" (NIHON JUNYAKU CO., LTD), "U-Jelly CP" (SHOWA DENKO K.K.), "CARBOPOL #934" (B.F. Goodrich Company). Polymerization degree of cross-linked polyacrylate is preferably about 2,000,000 to 6,000,000. The amount of cross-linked polyacrylate salts employed preferably ranges about 0.05–0.5% by weight based on the amount of a key aqueous ball point ink composition comprising coloring material consisting of (pigment and pigment dispersant) and/or precolored emulsion resin, water-soluble organic solvent, pseudoplastic imparting agent and water as essential components. When the amount of cross-linked polyacrylate salt employed is too small, the aqueous ball point ink composition is not stable enough at elevated temperature. In contrast, when the amount of cross-linked polyacrylate salt employed is too much, writability of ball point pen is deteriorated due to increased viscosity of the ink composition. The salt of cross-linked polyacrylate is employed singly or in a mixture thereof.

The key aqueous ball point ink composition of the invention is known. Each component or proportion thereof is not specifically limited to, but usually as shown below.

A variety of known pigments, pigment dispersants and precolored emulsion resins may be employed as components of coloring material. Examples of pigments are azo pigment, condensed polyazo pigment, phthalocyanine pigment, quinacridone pigment, anthraquinone pigment, dioxazine pigment, indigoid pigment, thioindigoid pigment, perinone, perylene pigment, melamine pigment and like organic pigments; and titanium oxide, iron oxide, carbon black and like inorganic pigment, which are employed singly or in a mixture thereof. Examples of precolored emulsion resin are substances prepared by dyeing water dispersion of fine powder of polymer having average particle diameter of about 0.1–1 μm prepared by emulsion polymerization of one or more of stylene resin, acrylic resin, acrylonitrile resin, etc., with basic dye, fluorescent basic dye, fluorescent brightner, etc. Examples of precolored emulsion resins are, specifically, "LUMICOL #2100 series" and "LUMICOL #3000 series" (trademark, product of NIPPON KEIKO KAGAKU Co., LTD.). At least one of water soluble resins, surfactants etc. conventionally employed in an ink composition may be employed as pigment dispersants. As water soluble resins are employed any one of natural products, synthetic and semi-synthetic products. Synthetic products are most preferable with respect to mildew resistant and antiseptic properties and characteristic properties of viscosity as writing utensils. Examples of water-soluble synthetic resins are water-soluble acrylic resin, water-soluble maleic acid resin, water-soluble styrene resin, water-soluble styrene-acrylic resin, water-soluble styrene-maleic acid resin, polyvinyl pyrrolidone, polyvinyl alcohol and water-soluble urethane resin. As surfactant, at least one of anionic, cationic, nonionic and amphoteric surfactants is suitably employed. As coloring materials is employed at least one selected from the group consisting of (pigments and pigment dispersants) and precolored emulsion resins.

When pigment is employed as coloring material, the amount of pigment employed usually ranges from about 1–30% by weight, preferably about 3–15% by weight based on the amount of key aqueous ball point ink composition. The pigment dispersant employed ranges about 5–200% by weight based on the amount of pigment. When precolored emulsion resin is employed as coloring material, the amount of precolored emulsion resin employed usually ranges about 10–50% by weight, preferably about 25–40% by weight based on the amount of key aqueous ball point ink composition. When the amount of coloring materials employed is too small, handwritting of the ink become weak. In contrast, when the amount of coloring materials employed is too much, viscosity of ink composition increases resulting in impairing drawability. When the amount of pigment dispersant employed is too small, dispersion stability of pigment decreases. In contrast, when the amount of pigment dispersant employed is too much, viscosity of ink composition increases resulting in impairing drawability of ink composition.

Examples of water-soluble organic solvent are ethyleneglycol, diethyleneglycol, propyleneglycol, glycerin and like polyhydric alcohols; propyleneglycol monomethylether and like glycolethers; propyleneglycol monomethylether acetate and like glycoletheresters. Such water-soluble organic solvents are employed singly or in a mixture of two or more. The amount of water-soluble organic solvent employed usually ranges about 1–40% by weight based on the amount of key aqueous ball point ink composition. When the amount of water-soluble organic solvent employed is too small, handwritting of the ink become blurred due to rapid drying of ink at a point of tip. In contrast, when the amount of water-soluble organic solvents employed is too much, drying of ink is delayed.

As pseudoplastic imparting agent, natural polysaccharides, semi-synthetic cellulose polymers are suitably employed. Examples of natural polysaccharides are Welan gum, Xanthan gum, Cyamoposis gum, Locust bean gum and Rhamsan gum having polymeric formula composed of monosaccharides such as glucose, galactose, rhamnose, mannose, glucuronate salt, etc. Welan gum and Xanthan gum are particularly preferable as pseudoplastic imparting agent. The amount of pseudoplastic imparting agent employed preferably ranges about 0.1–0.5% by weight based on the amount of key aqueous ball point ink composition. When the amount of pseudoplastic imparting agent employed is too small, dispersion stability of coloring material is not improved. In contrast, when the amount of pseudoplastic imparting agent employed is too much, viscosity of ink composition increases leading to decrease of drawability. A pH adjusting agent, lubricant, rust preventive, antiseptic known in the field of ink composition may be blended with the aqueous ball point ink composition of the invention. Examples of pH adjusting agents are sodium hydroxide, sodium carbonate, alkanol amine and ammonia. Examples of lubricants are alkali metal salts or alkanol amine salts of fatty acids and phosphorous surfactants. Examples of rust preventives are benzotriazole and derivatives thereof and dicyclohexylammonium nitrate. Examples of antiseptics are potassium sorbate, sodium benzoate, sodium pentachlorophenolate, sodium dihydroacetate, 1,2-benzisothiazoline-3-on. As antiseptic, 1,2-benzisothiazoline-3-on is particularly preferable.

The aqueous ball point ink composition of the invention is not specifically limited to, but usually applied to refillable ball point pen provided with cap as briefly shown in FIG. 1. Specifically, a refillable ball point pen comprises barrel body (1) containing ink tank (2) which is closed by top stopper (3) provided with tip (4), and tail stopper (5). A drying preventing material (9) is placed in an internal cylinder formed in tail stopper (5). An aqueous ball point ink composition is directly filled in ink tank (2), at the end of which a back flow preventing element (7) is provided with. A cap (8) is detached while employed.

The salts of cross-linked polyacrylate employed in the invention are adsorbed on the surface of pigment and/or precolored emulsion resin as coloring material leading to formation of protective colloid, which improves heat stability and inhibit decrease of viscosity of the ink composition. Deterioration of characteristic properties of ink due to sedimentation of coloring materials is therefore inhibited, even when a ball point pen filled with the ink composition of the invention is allowed to stand at elevated temperature. Consequently, the ball point ink composition of the invention does not cause clogging at a point of tip due to sedimentation of coloring materials after long-term storage under elevated temperature. As apparent from comparison of examples and comparative examples below, the salts of crosslinked polyacrylate exerts excellent effects only in combination with pseudoplastic imparting agent.

PREFERRED EMBODYMENTS FOR CARRUNG OUT THE INVENTION

Examples are given below to illustrate the present invention in greater detail.

In the following examples, "part" means "part by weight".

EXAMPLE 1

The ink composition of the invention was prepared by using the following substances.

| Component | Amount (part) |
|---|---|
| Copper(II) phthalocyanine blue | 4.0 |
| Styrene-acrylate copolymer sodium salt (pigment dispersant) | 1.0 |
| Diethyleneglycol | 10.0 |
| Glycerin | 5.0 |
| Crosslinked-type acrylate copolymer sodium salt (trademark "RHEOGIC 250H" Nihon Junyaku Co., Ltd.; number-average molecular weight = about 2,500,000) | 0.1 |
| 1,2-Benzisothiazoline-3-on (antiseptic) | 0.5 |
| Benzotriazole (rust preventive) | 0.5 |
| Xanthan gum (pseudoplastic imparting agent) | 0.3 |
| Water | 78.7 |

In the procedure of preparing ink composition, to 30 parts of water was added Xanthan gum in limited amounts with stirring to make a clear solution. To the solution were added copper(II) phthalocyanine blue, styrene-acrylate copolymer sodium salt and 48.7 parts of water, and the resulting mixture was dispersed with sand mill for 1 hour. To the suspension was added a solution previously prepared by stirring and dissolving a mixture consisting of the other components. The resulting mixture was stirred for 1 hour, adjusted at a pH of 8 with aqueous sodium hydroxide, and then filtered to obtain a blue ink.

EXAMPLE 2

| Component | Amount (part) |
|---|---|
| Copper(II) phthalocyanine green | 4.0 |
| Styrene-acrylate copolymer sodium salt (pigment dispersant) | 1.5 |
| Propyleneglycol | 10.0 |
| Glycerin | 5.0 |
| Crosslinked-type acrylate copolymer sodium salt (trademark "JUNLON PW110" Nihon Junyaku Co., Ltd.; 3% aqueous solution; number-average molecular weight = about 1,100,000; neutralized with equivalent NaOH) | 5.0 |
| Sodium benzoate (antiseptic) | 1.0 |
| Benzotriazole (rust preventive) | 0.5 |
| Welan gum (pseudoplastic imparting agent), | 0.4 |
| Water | 77.6 |

In the procedure of preparing ink composition, to 30 parts of water was added Welan gum in limited amounts with stirring to make a clear solution. To the solution were added copper(II) phthalocyanine green, styrene-acrylate copolymer sodium salt and 42.6 parts of water, and the resulting mixture was dispersed with sand mill for 1 hour. To the suspension was added a solution previously prepared by stirring and dissolving a mixture consisting of the other components. The resulting mixture was stirred for 1 hour, adjusted at a pH of 8 with aqueous sodium hydroxide, and then filtered to obtain a green ink.

EXAMPLE 3

| Component | Amount (part) |
|---|---|
| Yellow precolored resin emulsion (trademark "LUMICOL NKW-2105", Nippon Keiko Kagaku Co., Ltd.; containing C.I. Basic Yellow 40) | 40.0 |
| Glycerin | 5.0 |
| Propyleneglycol | 10.0 |
| Crosslinked-type acrylate copolymer sodium salt (trademark "JUNLON PW110" Nihon Junyaku Co., Ltd.; 3% aqueous solution; number-average molecular weight = about 1,100,000; neutralized with equivalent NaOH) | 6.0 |
| Sodium benzoate (antiseptic) | 1.0 |
| Benzotriazole (rust preventive) | 0.5 |
| Xanthan gum (pseudoplastic imparting agent) | 0.3 |
| Water | 43.2 |

In the procedure of preparing ink composition, to 30 parts of water was added Xanthan gum in limited amounts with stirring to make a clear solution. To the solution was added a solution previously prepared by stirring and dissolving a mixture consisting of the other components. The resulting mixture was stirred for 1 hour, adjusted at a pH of 7 with aqueous sodium hydroxide, and then filtered to obtain a fluorescent yellow ink.

EXAMPLE 4

| Component | Amount (part) |
|---|---|
| Carbon black | 4.0 |
| Styrene-acrylate copolymer sodium salt (pigment dispersant) | 1.0 |
| Propyleneglycol | 10.0 |
| Ethyleneglycol | 5.0 |
| Crosslinked-type acrylate copolymer sodium salt (trademark "CARBOPOL #940" B. F. Goodrich Company; 3% aqueous solution; number-average molecular weight = about 4,000,000; neutralized with equivalent NaOH) | 2.0 |
| Sodium benzoate (antiseptic) | 1.0 |
| Benzotriazole (rust preventive) | 0.5 |
| Xanthan gum (pseudoplastic imparting agent) | 0.2 |
| Water | 78.3 |

In the procedure of preparing ink composition, to 30 parts of water was added Xanthan gum in limited amounts with stirring to make a clear solution. To the solution was added a solution previously prepared by suspending carbon black, styrene-acrylate copolymer sodium salt and 46.3 parts of water with sand mill for 1 hour, followed by adding the other components to the suspension and dissolving the components with stirring. The resulting mixture was stirred for 1 hour, adjusted at a pH of 8 with aqueous sodium hydroxide, and then filtered to obtain a black ink.

EXAMPLE 5

| Component | Amount (part) |
|---|---|
| Dioxazine violet | 3.0 |
| Styrene-acrylate copolymer sodium salt | 1.0 |

-continued

| Component | Amount (part) |
|---|---|
| (pigment dispersant) | |
| Ethyleneglycol | 10.0 |
| Glycerin | 5.0 |
| Crosslinked-type acrylate copolymer sodium salt (trademark "RHEOGIC 250H" Nihon Junyaku Co., Ltd.) | 0.2 |
| 1,2-Benzisothiazoline-3-on (antiseptic) | 0.5 |
| Benzotriazole (rust preventive) | 0.5 |
| Xanthan gum (pseudoplastic imparting agent) | 0.3 |
| Water | 79.3 |

In the procedure of preparing ink composition, to 30 parts of water was added Xanthan gum in limited amounts with stirring to make a clear solution. To the solution was added a solution previously prepared by suspending dioxazine violet, styrene-acrylate copolymer sodium salt and 49.5 parts of water with sand mill for 1 hour, followed by adding the other components to the suspension and dissolving the components with stirring. The resulting mixture was stirred for 1 hour, adjusted at a pH of 8 with aqueous sodium hydroxide, and then filtered to obtain a violet ink.

EXAMPLE 6

| Component | Amount (part) |
|---|---|
| Quinacridone red | 4.0 |
| Styrene-acrylate copolymer sodium salt (pigment dispersant) | 1.5 |
| Ethyleneglycol | 10.0 |
| Glycerin | 5.0 |
| Crosslinked-type acrylate copolymer alkanolamine salt (trademark "JUNLON PW110" Nihon Junyaku Co., Ltd.; 3% aqueous solution; neutralized with equivalent $N(CH_2CH_2OH)_3$) | 5.0 |
| Sodium benzoate (antiseptic) | 1.0 |
| Benzotriazole (rust preventive) | 0.5 |
| Welan gum (pseudoplastic imparting agent) | 0.3 |
| Water | 78.2 |

In the procedure of preparing ink composition, to 30 parts of water was added Welan gum in limited amounts with stirring to make a clear solution. To the solution was added a solution previously prepared by suspending quinacridone red, styrene-acrylate copolymer sodium salt and 42.7 parts of water with sand mill for 1 hour, followed by adding the other components to the suspension and dissolving the components with stirring. The resulting mixture was stirred for 1 hour, adjusted at a pH of 8 with aqueous sodium hydroxide, and then filtered to obtain a red ink.

EXAMPLE 7

| Component | Amount (part) |
|---|---|
| Red precolored resin emulsion (trademark "LUMICOL NKW-2117", Nippon Keiko Kagaku Co., Ltd.; containing C.I. Basic Violet 11:C.I. Basic Red = 1:1) | 40.0 |
| Glycerin | 5.0 |
| Diethyleneglycol | 10.0 |
| Crosslinked-type acrylate copolymer sodium salt (trademark "JUNLON PW110" Nihon Junyaku Co., Ltd.; 3% aqueous solution; neutralized with equivalent NaOH) | 3.0 |
| 1,2-Benzisothiazoline-3-on (antiseptic) | 0.5 |
| Benzotriazole (rust preventive) | 0.5 |
| Xanthan gum (pseudoplastic imparting agent) | 0.4 |
| Water | 43.4 |

In the procedure of preparing ink composition, to 30 parts of water was added Xanthan gum in limited amounts with stirring to make a clear solution. To the solution was added a solution previously prepared by adding and dissolving the other components with stirring. The resulting mixture was stirred for 1 hour, adjusted at a. pH of 7 with aqueous sodium hydroxide, and then filtered to obtain a fluorescent pink ink.

EXAMPLE 8

| Component | Amount (part) |
|---|---|
| Violet precolored resin emulsion (trademark "LUMICOL NKW-2367", Nippon Keiko Kagaku Co., Ltd.; containing C.I. Basic Violet 7) | 40.0 |
| Propyleneglycol | 10.0 |
| Glycerin | 5.0 |
| Crosslinked-type acrylate copolymer sodium salt (trademark "CARBOPOL #940" B. F. Goodrich Company; 3% aqueous solution; neutralized with equivalent NaOH) | 8.0 |
| Sodium benzoate (antiseptic) | 1.0 |
| Benzotriazole (rust preventive) | 0.5 |
| Xanthan gum (pseudoplastic imparting agent) | 0.2 |
| Water | 34.3 |

In the procedure of preparing ink composition, to 30 parts of water was added Xanthan gum in limited amounts with stirring to make a clear solution. To the solution was added a solution previously prepared by adding and dissolving the other components with stirring. The resulting mixture was stirred for 1 hour, adjusted at a pH of 7 with aqueous sodium hydroxide, and then filtered to obtain a fluorescent pink ink.

Comparative Example 1

A blue ink was obtained according to the same procedure as example 1 except that Xanthan gum in ink components of example 1 was replaced by the same amount of water.

Comparative Example 2

A green ink was obtained according to the same procedure as example 1 except that Welan gum in ink components of example 1 was replaced by the same amount of water.

Comparative Example 3

A fluorescent yellow ink was obtained according to the same procedure as example 3 except that Xanthan gum in ink components of example 3 was replaced by the same amount of water.

Comparative Example 4

A black ink was obtained according to the same procedure as example 4 except that Xanthan gum in ink components of example 4 was replaced by the same amount of water.

Comparative Example 5

A violet ink was obtained according to the same procedure as example 1 except that crosslinked-type acrylate copolymer in ink components of example 1 was replaced by the same amount of water.

Comparative Example 6

A violet ink was obtained according to the same procedure as example 2 except that crosslinked-type acrylate copolymer in ink components of example 2 was replaced by the same amount of water.

Comparative Example 7

A violet ink was obtained according to the same procedure as example 3 except that crosslinked-type acrylate copolymer in ink components of example 3 was replaced by the same amount of water.

Comparative Example 8

A violet ink was obtained according to the same procedure as example 4 except that crosslinked-type acrylate copolymer in ink components of example 4 was replaced by the same amount of water.

Test Example 1

Stability of the aqueous ink compositions prepared in examples 1–8 and comparative examples 1–8 at room temperature and elevated temperature was decided according to the following procedure by using refillable ball point pen shown in FIG. 1.

Specifically, a pipe-like ink tank (2) made of polypropylene was directly filled with the aqueous ink composition. After attaching back flow preventing element (7) to the end of ink tank, the refill obtained by connecting ink tank (2) with top stopper (3) fitted with tip (4) made of nickel silver was deaerated by centrifugal separator.

A ball point pen as shown in FIG. 1 was assembled with said refill. After allowing the ball point pen to stand in a thermostat chamber at 70° C. for 2 weeks in condition that the tip was maintained downward, helical circles having a diameter of 2 cm were written with hand. The number of circles until handwritting density of the pen reached as high as the density of a ball point pen immediately after production was determined to decide stability at elevated temperature.

Further, after allowing the ball point pen to stand at room temperature for 12 months in conditions that the tip was maintained downward, continuous circles having a diameter of 2 cm were written with hand. The number of circles until handwritting density of the pen reached as high as the density of a ball point pen immediately after production was determined to decide stability at room temperature.

Ink viscosity was determined by Brookfield type viscometer (TOKIMEC INC.; BL TYPE VISCOMETER) in No.3 rotary bob and 6 rpm.

The results are shown in Table 1

TABLE 1

| Ink | Change of handwritting density after 2 weeks at 70° (the number of circles) | Change of handwritting density after 12 months at r.t. (the number of circles) | Initial viscosity (cps) at 20° C. |
|---|---|---|---|
| Ex. 1 | <1 | <1 | 4,500 |
| Ex. 2 | <1 | <1 | 7,800 |
| Ex. 3 | <1 | <1 | 4,100 |
| Ex. 4 | <1 | <1 | 2,400 |
| Ex. 5 | <1 | <1 | 3,600 |
| Ex. 6 | <1 | <1 | 4,500 |
| Ex. 7 | <1 | <1 | 5,800 |
| Ex. 8 | <1 | <1 | 3,400 |
| Comp. Ex. 1 | none* | 53 | 300 |
| Comp. Ex. 2 | none* | 45 | 200 |
| Comp. Ex. 3 | none* | 53 | 400 |
| Comp. Ex. 4 | none* | 45 | 600 |
| Comp. Ex. 5 | 12 | 36 | 3,100 |
| Comp. Ex. 6 | 8 | 25 | 6,100 |
| Comp. Ex. 7 | 15 | 48 | 4,300 |
| Comp. Ex. 8 | 24 | 63 | 1,800 |

*) No Ink is discharged.

It is apparent from the results shown in Table 1 that the aqueous ball point ink composition of the invention employing salts of crosslinked polyacrylate in the presence of pseudoplastic imparting agent is excellent in not only long-term storage stability at room temperature but also stability under aging acceleration conditions at elevated temperature. Therefore, the aqueous ball point ink composition of the invention maintains handwritting characteristics immediately after production, even when the ink composition is stored under high temperature in summer, for example, by preventing change of properties thereof.

We claim:

1. In an aqueous ball point ink composition comprising (i) a colorant selected from the group consisting of (a) a pigment and a dispersant (b) a precolored emulsion resin and (c) a mixture of (a) and (b);

(ii) a water-soluble organic solvent;

(iii) a pseudoplastic imparting agent; and (iv) water;

the improvement wherein the composition further comprises a cross-linked polyacrylate salt having a number average molecular weight ranging from about 2,000,000 to 6,000,000, as a free acid, in an amount of about 0.05–0.5% by weight based on the weight of said colorant, solvent, pseudoplastic imparting agent and water.

2. The aqueous ball point ink composition according to claim 1 wherein said composition has a viscosity of about 2,000 to 8,000 cps at 20° C.

3. The aqueous ball point ink composition according to claim 1 wherein said pseudoplastic imparting agent comprises Welan gum and/or Xanthan gum.

4. The aqueous ball point ink composition according to claim 1 wherein said aqueous ball point ink composition further comprises antiseptic.

5. The aqueous ball point ink composition according to claim 4 wherein said antiseptic comprises 1,2-benzisothiazoline-3-on.

6. A ball point pen comprises an ink storage vessel filled an aqueous ball point ink composition according to claim 1.

* * * * *